United States Patent
Nishimura et al.

(10) Patent No.: US 11,170,911 B2
(45) Date of Patent: Nov. 9, 2021

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Shigeki Ikeda, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES. LTD., Osaka (JP)

( * ) Notice: Subject to any disclaimer, the term of this patent is extended or adjusted under 35 U.S.C. 154(b) by 0 days.

(21) Appl. No.: 17/058,317

(22) PCT Filed: Feb. 25, 2019

(86) PCT No.: PCT/JP2019/007024
§ 371 (c)(1),
(2) Date: Nov. 24, 2020

(87) PCT Pub. No.: WO2019/225096
PCT Pub. Date: Nov. 28, 2019

(65) Prior Publication Data
US 2021/0202129 A1 Jul. 1, 2021

(30) Foreign Application Priority Data
May 25, 2018 (JP) .............................. JP2018-100559

(51) Int. Cl.
*H01B 7/08* (2006.01)
*B60R 16/02* (2006.01)

(52) U.S. Cl.
CPC ............ *H01B 7/0846* (2013.01); *B60R 16/02* (2013.01)

(58) Field of Classification Search
CPC ...... H01B 7/0846; H01B 7/08; H01B 7/0823; H01B 7/04; B60R 16/02; B60R 16/0207; H05K 1/028
See application file for complete search history.

(56) References Cited

U.S. PATENT DOCUMENTS

| 3,836,415 | A | * | 9/1974 | Hilderbrandt | .... H01B 13/01254 156/181 |
| 4,406,915 | A | * | 9/1983 | Lang | .................... H02G 1/1295 174/117 F |

(Continued)

FOREIGN PATENT DOCUMENTS

| JP | S59-27411 | 2/1984 |
| JP | 2-17879 | 2/1990 |

(Continued)

OTHER PUBLICATIONS

International Search Report issued in International Patent Application No. PCT/JP2019/007024, dated Apr. 23, 2019 (along with an English translation thereof).

(Continued)

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

A wiring member includes a plurality of wire-like transmission members disposed along a common route on an object-attached part and a base member keeping the plurality of wire-like transmission members in a flat state, wherein the plurality of wire-like transmission members include a first wire-like transmission member and a second wire-like trans- (Continued)

mission member longer than the first wire-like transmission member.

8 Claims, 7 Drawing Sheets

(56) References Cited

U.S. PATENT DOCUMENTS

| | | | | |
|---|---|---|---|---|
| 4,831,278 | A * | 5/1989 | Ueda | B60R 16/0207 |
| | | | | 174/71 R |
| 6,927,343 | B2 * | 8/2005 | Watanabe | G01R 1/07314 |
| | | | | 174/254 |
| 2006/0109394 | A1 | 5/2006 | Miyagawa et al. | |
| 2017/0215285 | A1 * | 7/2017 | Nomura | H05K 1/119 |
| 2017/0303388 | A1 * | 10/2017 | Mathewson | A61B 6/589 |
| 2018/0020550 | A1 * | 1/2018 | Jang | H05K 1/111 |
| 2018/0268958 | A1 | 9/2018 | Aoyama et al. | |
| 2018/0283844 | A1 * | 10/2018 | Kamakura | G01B 7/20 |
| 2019/0148927 | A1 * | 5/2019 | Kato | B60R 16/0215 |
| | | | | 361/622 |
| 2019/0263338 | A1 * | 8/2019 | Wang | H01B 7/08 |
| 2020/0141518 | A1 * | 5/2020 | Nakano | H01B 7/40 |
| 2020/0180525 | A1 * | 6/2020 | Yamaguchi | H01B 7/40 |
| 2020/0411215 | A1 * | 12/2020 | Takeoka | H01B 7/421 |
| 2021/0024020 | A1 * | 1/2021 | Nishimura | B60R 16/0215 |
| 2021/0028346 | A1 * | 1/2021 | Martinis | H01L 23/5387 |
| 2021/0111545 | A1 * | 4/2021 | Hasegawa | B60R 16/02 |
| 2021/0241937 | A1 * | 8/2021 | Ito | B21D 5/02 |

FOREIGN PATENT DOCUMENTS

| | | |
|---|---|---|
| JP | 2006-119491 | 5/2006 |
| JP | 2014-11910 | 1/2014 |
| JP | 2016-126961 | 7/2016 |
| JP | 2017063573 A * | 3/2017 |

OTHER PUBLICATIONS

Japanese Office Action in counterpart Application No. 2018-100559, dated Jun. 8, 2021 (along with English translation thereof).

* cited by examiner

F I G. 1 1
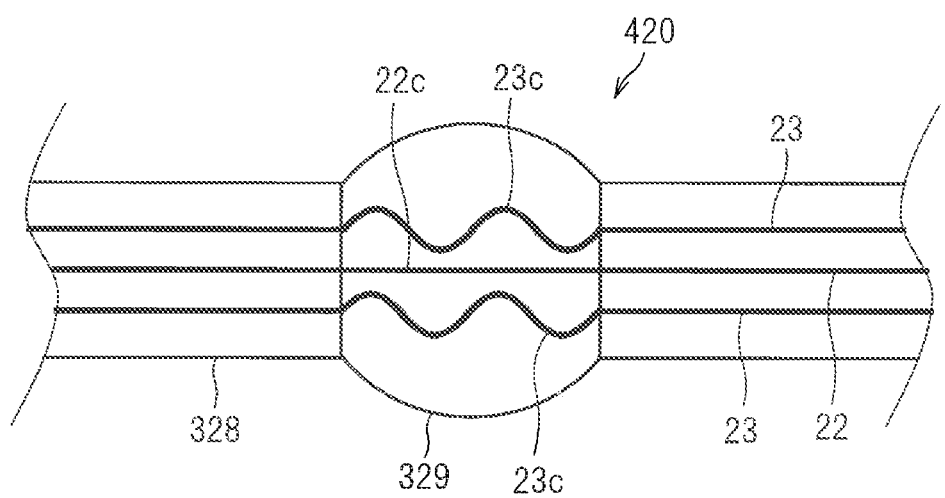

WIRING MEMBER

TECHNICAL FIELD

The present disclosure relates to a wiring member.

BACKGROUND ART

Patent Document 1 discloses a flexible flat cable which includes a sheet-like insulator having flexibility and a flat conductor formed in the insulator, wherein a first end and a second end on an opposite side of the first end are connected to two in-vehicle electronic units, respectively. The flat cable is made up of two thin insulating films sandwiching a plurality of conductors, which are parallelly disposed, from both sides, for example.

PRIOR ART DOCUMENTS

Patent Documents

Patent Document 1: Japanese Patent Application Laid-Open No. 2014-11910

SUMMARY

Problem to be Solved by the Invention

The plurality of conductors are parallelly disposed in the flat cable described above. When such a flat cable is disposed along a surface of an object-attached part having a convex-concave portion, there is a possibility that a part of the flat cable is significantly separated from the surface.

Accordingly, an object of the present disclosure is to provide a technique of locating a flat wiring member on a surface of an object-attached part having a convex-concave portion as closely as possible when the flat wiring member is disposed on the surface.

Means to Solve the Problem

A wiring member according to the present disclosure includes a plurality of wire-like transmission members disposed along a common route on an object-attached part and a base member keeping the plurality of wire-like transmission members in a flat state, wherein the plurality of wire-like transmission members include a first wire-like transmission member and a second wire-like transmission member longer than the first wire-like transmission member.

Effects of the Invention

According to the present disclosure, a flat wiring member is disposed on a surface of an object-attached part having a convex-concave portion as closely as possible when the flat wiring member is disposed on the surface.

BRIEF DESCRIPTION OF DRAWINGS

FIG. 11 is a schematic plan view illustrating a wiring member according to a fourth modification example.

DESCRIPTION OF EMBODIMENT(S)

Description of Embodiment of Present Disclosure

Figure 1:
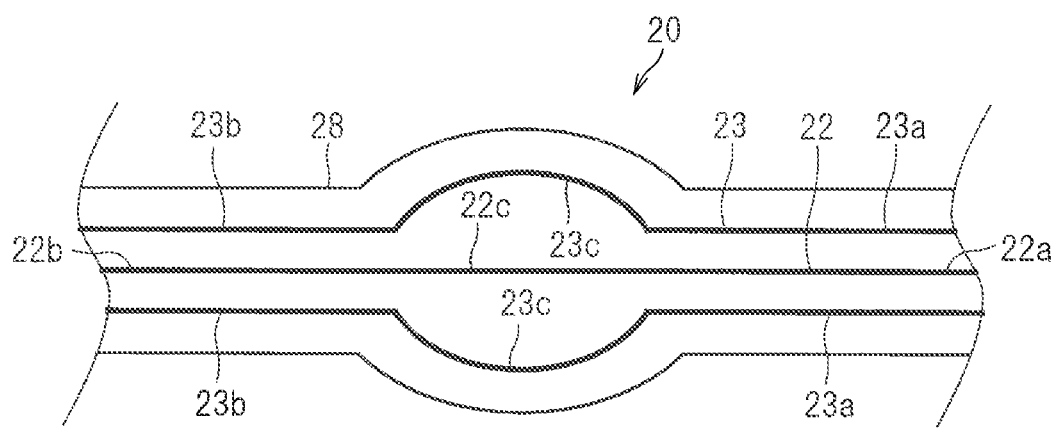
FIG. 1 is a schematic plan view illustrating a wiring member according to an embodiment.

Embodiments of the present disclosure are listed and described firstly.

A wiring member according to the present disclosure is as follows.

(1) A wiring member according to the present disclosure is a wiring member including a plurality of wire-like transmission members disposed along a common route on an object-attached part and a base member keeping the plurality of wire-like transmission members in a flat state, wherein the plurality of wire-like transmission members include a first wire-like transmission member and at least one second wire-like transmission member longer than the first wire-like transmission member.

Accordingly, when the wiring member is disposed on an uneven surface of the object-attached part, the wiring member is disposed along the uneven surface of the object-attached part so that the first wire-like transmission member passes through a relatively short route and the second wire-like transmission member passes through a relatively long route. Thus, a flat wiring member is disposed on a surface of an object-attached part having a convex-concave portion as closely as possible when the flat wiring member is disposed on the surface.

(2) A part of the first wire-like transmission member and a part of the second wire-like transmission member are held by the base member in a parallel state, another part of the first wire-like transmission member and another part of the second wire-like transmission member are held by the base member in a parallel state in a position away from the part of the first wire-like transmission member and the part of the second wire-like transmission member, and a length between the part of the second wire-like transmission member and the another part of the second wire-like transmission member may be larger than a length between the part of the first wire-like transmission member and the another part of the first wire-like transmission member.

When the wiring member is disposed on the uneven surface of the object-attached part, the wiring member can be disposed along the uneven surface of the object-attached part so that an intermediate part between the part of the first wire-like transmission member and the another part of the first wire-like transmission member passes through a shortest route and an intermediate part between the part of the second wire-like transmission member and the another part of the second wire-like transmission member passes through a route longer than the shortest route. Thus, a flat wiring member is disposed on a surface of an object-attached part having a convex-concave portion as closely as possible when the flat wiring member is disposed on the surface.

(3) It is also applicable that the first wire-like transmission member includes a straight part held straight by the base member, and at least a part of the second wire-like transmission member corresponding to the straight part constitutes a curved part in a curved state.

The wiring member is disposed along the uneven surface of the object-attached part so that the straight part of the first wire-like transmission member passes through the shortest route, and the curved part of the second wire-like transmission member passes through the route longer than the shortest route. Thus, a flat wiring member is disposed on a surface of an object-attached part having a convex-concave portion as closely as possible when the flat wiring member is disposed on the surface.

(4) A length of the first wire-like transmission member may be different from a length of the second wire-like transmission member so as to be able to be parallelly disposed along the uneven surface of the object-attached part.

The first wire-like transmission member and the second wire-like transmission member are parallelly disposed along the uneven surface of the object-attached part, thus a flat wiring member is disposed on a surface of an object-attached part having a convex-concave portion as closely as possible when the flat wiring member is disposed on the surface.

(5) It is also applicable that the wiring member includes the plurality of second wire-like transmission members, and the plurality of second wire-like transmission members get gradually longer with increasing distance from the first wire-like transmission member.

The wiring member can be disposed along the uneven surface of the object-attached part so that the straight part of the first wire-like transmission member passes through the shortest route, and the plurality of second wire-like transmission members pass through the route where the plurality of second wire-like transmission members get gradually longer with increasing distance from the first wire-like transmission member. Thus, a flat wiring member is disposed on a surface of an object-attached part having a convex-concave portion as closely as possible when the flat wiring member is disposed on the surface.

(6) A part of the second wire-like transmission member longer than the first wire-like transmission member may be held by the base member. The second wire-like transmission member is held by the base member, thus suppressed is that the second wire-like transmission member is caught on the other member.

(7) A part of the second wire-like transmission member longer than the first wire-like transmission member may not be joined to the base member. The part of the second wire-like transmission member longer than the first wire-like transmission member is not joined to the base member, thus the part not joined to the base member can be easily disposed on the uneven surface of the object-attached part freely.

(8) At least a part of the base member may be an elongate part which can be elongated. The base member is elongated, thus the base member is also disposed on the uneven surface as closely as possible.

(9) It is also applicable that the base member is a sheet material, and the plurality of wire-like transmission members are members disposed on one main surface of the sheet material. The plurality of wire-like transmission members are easily disposed on the sheet material in a free form.

DETAILS OF EMBODIMENT OF PRESENT DISCLOSURE

Specific examples of a wiring member of the present disclosure are described hereinafter with reference to the drawings. The present invention is not limited to these examples, but is indicated by claims, and it is intended that meanings equivalent to claims and all modifications within a scope of claims are included.

Embodiment 1

A wiring member according to a first embodiment is described hereinafter. FIG. 1 is a schematic plan view illustrating a wiring member 20.

The wiring member 20 is a member connecting components mounted to a vehicle. The wiring member 20 includes a plurality of wire-like transmission members 22 and 23 and a base member 28.

The wire-like transmission members 22 and 23 are wire-like members transmitting electricity or light, for example. Described herein as an example is that the wire-like transmission members 22 and 23 are insulated wires 22 and 23 each including a core wire and an insulating covering for covering the core wire. The core wire is made up of one or a plurality of strands. The strand is formed of a conductor made of copper, copper alloy, aluminum, or aluminum alloy, for example. The insulating covering is formed of a resin material such as polyvinyl chloride (PVC) or polyethylene (PE) extrusion-molded around the core wire.

The base member 28 is a member keeping the plurality of wire-like transmission members 22 and 23 in a flat state.

An example of the base member 28 being the sheet material 28 is described herein. A material constituting the sheet material 28 is not particularly limited. The sheet material 28 is preferably formed of a material containing resin such as polyvinyl chloride (PVC), polyethylene terephthalate (PET), and polypropylene (PP), for example. The sheet material 28 may be a sheet material with an inner portion evenly filled or a non-woven sheet, for example. The sheet material 28 may contain a material such as metal, for example. The sheet material 28 preferably has flexibility of easily bending in a thickness direction. The sheet material 28 may be a single layer or may be a plurality of stacked layers. When the sheet material 28 is the plurality of stacked layers, it is considered that a resin layer and a resin layer are stacked, for example. It is also considered that a resin layer and a metal layer are stacked, for example.

In the example illustrated in FIG. 1, the sheet material 28 is formed to have an elongated shape, however, the shape of the sheet material 28 is not limited thereto. The sheet material 28 may be formed into a shape corresponding to an arrangement route of the insulated wires 22 and 23, for example.

The plurality of insulated wires 22 and 23 are disposed on one main surface of the sheet material 28.

A configuration of holding the plurality of insulated wires 22 and 23 on the main surface of the sheet material 28 is not particularly limited.

For example, a configuration of melting and joining the insulated wires 22 and 23 and the sheet material can be adopted as a configuration of joining them. That is to say, at least one of the insulated wires 22 and 23 and the sheet material has a resin material, and the resin material is melt to be joined to the other element. Herein, the insulating covering and the resin sheet material are melted together and mutually joined. In this case, the insulating covering and the resin sheet material preferably contain the same resin material.

Figure 2:
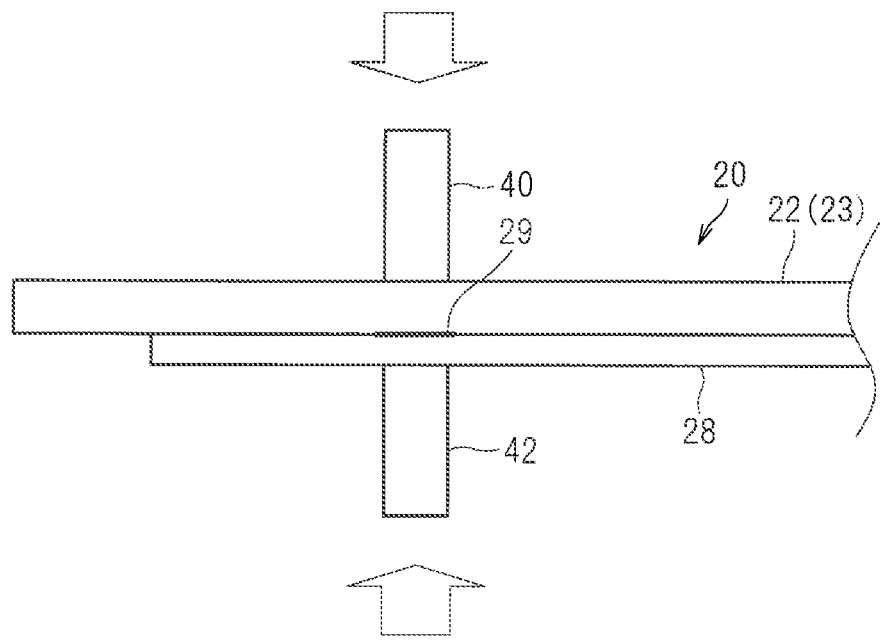
FIG. 2 is an explanation diagram illustrating a process of ultrasonic-joining an insulated wire to a sheet material.

Specifically, as illustrated in FIG. 2, for example, it is also applicable to sandwich the insulated wires 22 and 23 and the sheet material 28 between a chip 40 and an anvil 42 for ultrasonic joining to ultrasonic-weld the insulated wires 22 and 23 to the sheet material 28. In this case, the insulated wires 22 and 23 and the sheet material 28 are joined with a joint part 29, which is made up of at least one of the insulated wires 22 and 23 and the sheet material 28 which has been melted, therebetween.

The insulated wires 22 and 23 and the sheet material 28 can be melted and joined by various melting and jointing methods such as heating and pressurizing welding, hot-air welding, and high-frequency welding besides the ultrasonic welding described above.

A resin of at least the electrical wire and the sheet material may be melted or dissolved by heat or a solvent, and joined. A known joining configuration such as melting and joining, fusion, and welding can be adopted as the joining configuration.

The insulated wires 22 and 23 and the sheet material 28 may be joined by an adhesive agent or a double-sided tape, for example.

Figure 3:
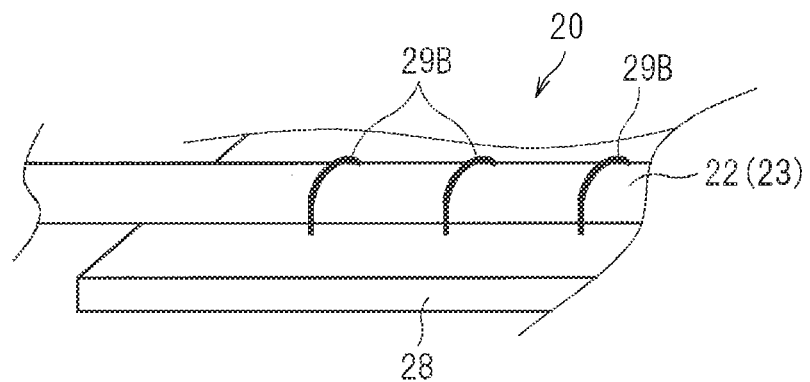
FIG. 3 is an explanation drawing illustrating the insulated wire sewn to the sheet material with a sewing thread.

As illustrated in FIG. 3, the insulated wires 22 and 23 may be sewn and joined to the sheet material 28 with a sewing thread 29B.

Figure 4:
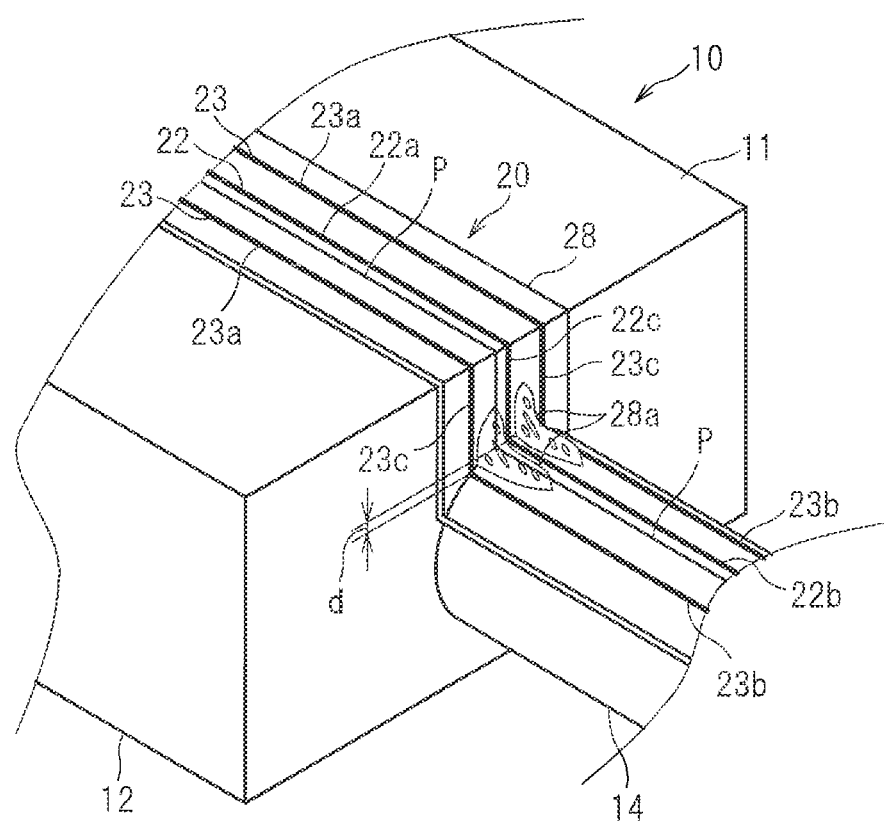
FIG. 4 is an explanation drawing illustrating the wiring member disposed along an uneven surface.

The insulated wires 22 and 23 which is the plurality of wire-like transmission members 22 and 23 are disposed along a common route on an object-attached part. For example, as illustrated in FIG. 4, an object-attached part 10 has a shape in which a cylindrical part 14 is connected to one side surface of a rectangular parallelepiped part 12. An arrangement route P is set from an upper surface of the rectangular parallelepiped part 12 along an upper part of an outer peripheral surface of the cylindrical part 14 via an upper part of one side surface of the rectangular parallelepiped part 12. The insulated wires 22 and 23 are disposed along the arrangement route P described above. The plurality of insulated wires 22 and 23 are disposed on one main surface of the sheet material 28 in a position where the plurality of insulated wires 22 and 23 can be disposed along the arrangement route P described above.

The plurality of insulated wires 22 and 23 as the plurality of wire-like transmission members 22 and 23 include a first insulated wire 22 as a first wire-like transmission member and a second insulated wire 23 as a second wire-like transmission member 23. The second insulated wire 23 is set longer than the first insulated wire 22.

A difference between a length of the first insulated wire 22 and a length of the second insulated wire 23 described above may be set to have a size so that the first insulated wire 22 and the second insulated wire 23 can be parallelly disposed along an uneven surface 11 of the object-attached part 10.

Considering with the example illustrated in FIG. 4, the first insulated wire 22 is disposed on a part of the outer peripheral surface of the cylindrical part 14 along an upper side of a central axis of the cylindrical part 14, thus a length of a part of the first insulated wire 22 disposed along the upper part of one side surface of the rectangular parallelepiped part 12 is relatively short. In contrast, the second insulated wires 23 are disposed along the outer peripheral surface of the cylindrical part 14 in a position away toward both sides of the first insulated wire 22. Thus, a length of a part of the second insulated wire 22 disposed along the upper part of one side surface of the rectangular parallelepiped part 12 to reach the outer peripheral surface of the cylindrical part 14 is relatively long. In FIG. 4, a route length of the second insulated wire 23 described above is longer than a route length of the first insulated wire 22 by a route length difference d.

Thus, the second insulated wire 23 is set longer than the first insulated wire 22 by the route length difference d. Accordingly, when the first insulated wire 22 and the second insulated wire 23 are disposed along the common arrangement route P, the first insulated wire 22 and the second insulated wire 23 can be parallelly disposed along the uneven surface 11.

More specifically, the plurality of insulated wires 22 and 23 include one first insulated wire 22 and the plurality of (two herein) second insulated wires 23. The plurality of first insulated wires 22, which are the example of the first wire-like transmission member, may also be provided. Only one or three or more second insulated wires 23, which are the example of the second wire-like transmission member, may also be provided.

A part 22a of the first insulated wire 22 and parts 23a of the plurality of second insulated wires 23 are held by the sheet material 28 in a parallel state (for example, a right side part in FIG. 1). The other part 22b of the first insulated wire 22 and the other parts 23b of the plurality of second insulated wires 23 are held by the sheet material 28 in a parallel state in a position away from the part 22a of the first insulated wire 22 and the parts 23a of the plurality of second insulated wires 23 (for example, a left side part in FIG. 1).

The part 22a and the other part 22b of the first insulated wire 22 are located in the positions away from each other in an extension direction of the first insulated wire 22. The part 23a and the other part 23b of the second insulated wire 23 are located in the positions away from each other in an extension direction of the second insulated wire 23. Herein, the other part 22b extends on a straight extension of the part 22a of the first insulated wire 22, and the other part 23b extends on a straight extension of the part 23a of the second insulated wire 23. A length of an intermediate part 23c between the part 23a and the other part 23b of the second insulated wire 23 is set larger than a length of an intermediate part 22c between the part 22a and the other part 22b of the first insulated wire 22 (by the route length difference d herein).

Herein, the part 22c between the above parts of the first insulated wire 22 is joined to the sheet material 28 while extending straight between the part 22a and the other part 22b located on both ends of the part 22c. This part 22c needs not be joined to the sheet material 28.

The part 23c between the above parts of the second insulated wire 23 is a part corresponding to the above straight part 22c. That is to say, the part 23c between the above parts of the second insulated wire 23 is a part located adjacent to the above straight part 22c. At least a part of this part 23c, herein, the whole part 23c constitutes a curved part 23c in a curved state. Herein, the curved part 23c is joined to the sheet material 28 in a state of being curved to be convexed on a side away from the first insulated wire 22. Parts on both sides of the sheet material 28 corresponding to the curved part 23c protrude toward outside to have an arc-like shape.

An operation of locating this wiring member 20 along the uneven surface 11 of the object-attached part 10 is performed as follows, for example.

Firstly, a part of the wiring member 20 holding the part 22a of the first insulated wire 22 and the part 23a of the second insulated wire 23 is disposed along the upper surface of the rectangular parallelepiped part 12. The part of the wiring member 20 holding the other part 22b of the first insulated wire 22 and the other part 23b of the second insulated wire 23 is disposed along the outer peripheral surface of the cylindrical part 14.

The part 22c of the wiring member 20 between the above parts of the first insulated wire 22 and the part 23c between the above parts of the second insulated wire 23 is disposed on one side surface of the rectangular parallelepiped part 12 along an upper side part of the cylindrical part 14. At this time, the part 22c between the above parts of the first insulated wire 22 and the part 23c between the above parts of the second insulated wire 23 extend immediately below from an edge of the upper surface of the rectangular parallelepiped part 12 along one side surface thereof. Then, the part 22c between the above parts of the first insulated wire 22 is disposed from the edge of the upper surface of the rectangular parallelepiped part 12 along one side surface thereof to reach the cylindrical part 14. The part 23c between the above parts of the second insulated wire 23 is longer than the part 22c between the above parts of the first insulated wire 22, thus is disposed from the edge of the upper surface of the rectangular parallelepiped part 12 along one side surface thereof to reach a surface part located slightly below a top part of the cylindrical part 14.

An interval between the part 22c between the above parts of the insulated wire 22 and the part 23c between the above parts of the second insulated wire 23 in the sheet material 28 is larger than an interval between the part 22a of the first insulated wire 22 and the part 23a of the second insulated wire 23 and an interval between the other part 22b of the first insulated wire 22 and the other part 23b of the second insulated wire 23 in the sheet material 28.

As described above, in a state where the first insulated wire 22 and the second insulated wire 23 are disposed along the uneven surface 11 of the object-attached part 10, the first insulated wire 22 and the second insulated wire 23 extend in substantially a parallel posture. Thus, it is assumed that an intermediate part between the part 22c between the above parts of the first insulated wire 22 and the part 23c between the above parts of the second insulated wire 23 in the sheet material 28 is redundant and causes a crimp 28a. It is sufficient that the sheet material 28 is provided with a crimp, loosened, or tucked so that the sheet material 28 follows the uneven surface 11 as closely as possible.

Assumed as a configuration of keeping the wiring member 20 described above in a state of being held on the object-attached part 10 are a configuration using a general clamp for fixing a vehicle, a configuration using a banding member such as an adhesive tape and a banding band, and a configuration using a double-sided tape and an adhesive agent, for example. Particularly, a banding member such as an adhesive tape and a banding band is used as a component keeping the wiring member 20 in a state of following the outer peripheral surface of the cylindrical part.

Figure 5:
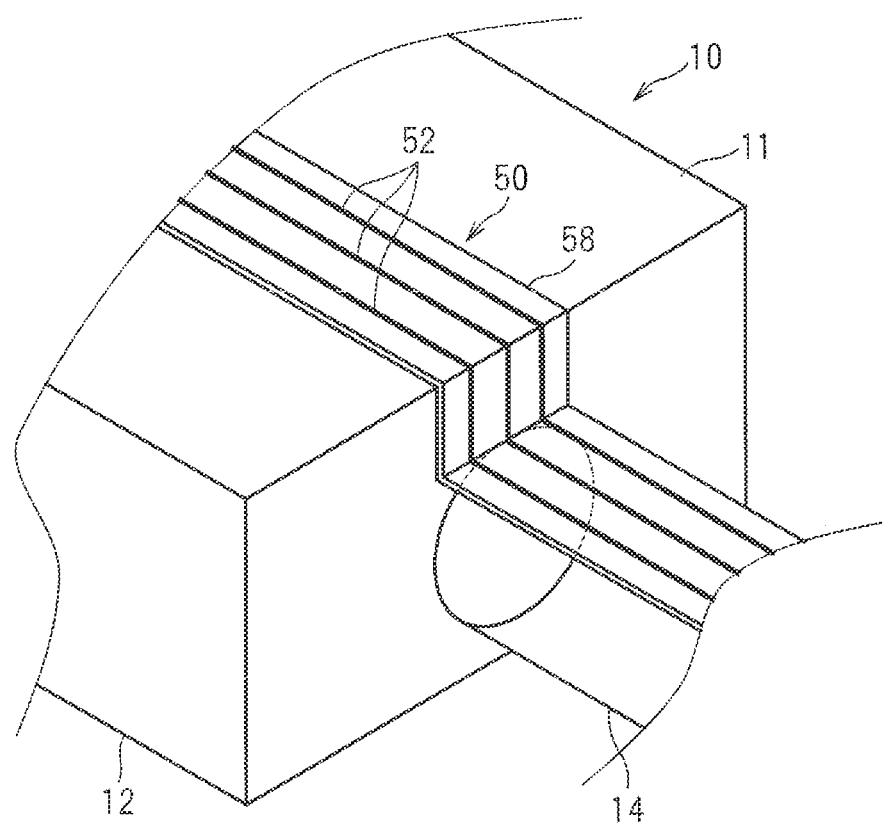
FIG. 5 is an explanation drawing illustrating a wiring member according to a comparison example disposed along an uneven surface.

FIG. 5 is an explanation drawing illustrating a wiring member 50 according to a comparison example. In this wiring member 50, a plurality of insulated wires 52 are held in a parallel state on a sheet material 58. This wiring member 50 is disposed along the uneven surface 11 of the object-attached part 10 in the manner similar to the above configuration. The insulated wires 52 disposed on both ends are too short, thus the wiring member 50 is hardly disposed along one side surface of the rectangular parallelepiped part 12 and the outer peripheral surface of the cylindrical part 14. It is found that the wiring member 50 comes off the outer peripheral surface of the cylindrical part 14. When the wiring member 50 comes off the uneven surface 11, a part where the wiring member 50 comes off becomes a dead space. In contrast, in the embodiment described above, the wiring member 20 including the first insulated wire 22 and the second insulated wire 23 is disposed as closely as possible, thus the dead space is hardly generated on an upper side of the uneven surface 11.

According to the wiring member 20 having the configuration described above, when the wiring member 20 is disposed on the uneven surface 11 of the object-attached part 10, the wiring member 20 can be disposed along the uneven surface 11 so that the relatively short first insulated wire 22 passes through the relatively short route and the relatively long second insulated wire 23 passes through the relatively long route. Thus, when the flat wiring member is disposed on the uneven surface 11 of the object-attached part 10, the flat wiring member can be disposed on the uneven surface 11 as closely as possible. Thus, the wiring member 20 hardly comes off the uneven surface 11, and the dead space is reduced as much as possible.

The part 22a of the first insulated wire 22 and parts 23a of the plurality of second insulated wires 23 are held by the sheet material 28 in the parallel state. The other part 22b of the first insulated wire 22 and the other parts 23b of the plurality of second insulated wires 23 are held by the sheet material 28 in the parallel state. These parts are appropriate to be disposed along a part where a route difference hardly occurs between the first insulated wire 22 and the second insulated wire 23 (the upper surface of the rectangular parallelepiped part 12 and the outer peripheral surface of the cylindrical part in the above example), for example. The length of the intermediate part 23c between the part 23a and the other part 23b of the second insulated wire 23 is set larger than the length of the intermediate part 22c between the part 22a and the other part 22b of the first insulated wire 22. These parts are appropriate to be disposed on a part where a route difference may occur between the first insulated wire 22 and the second insulated wire 23 (a region from one side surface of the rectangular parallelepiped part 12 to the outer peripheral surface of the cylindrical part in the above example). That is to say, the wiring member 20 can be disposed along the uneven surface 11 of the object-attached part 10 so that the intermediate part between the part 22a and the other part 22b of the first insulated wire 22 passes through the relatively short route and the intermediate part 23c between the part 23a and the other part 23b of the second insulated wire 23 passes through the relatively long route.

The first insulated wire 22 includes the straight part 22c held straight by the sheet material 28, and at least a part of the second insulated wire 23 corresponding to the straight part 22c constitutes the curved part 23c in the curved state. Thus, the straight part 22c can be disposed straight along the relatively short route easily, and the curved part 23c may extend substantially straight and be disposed along the relatively long route. Accordingly, when the flat wiring member 20 is disposed on the uneven surface 11 of the object-attached part 10, the flat wiring member 20 is disposed on the uneven surface 11 as closely as possible.

It is sufficient that a length of the first insulated wire 22 is different from a length of the second insulated wire 23 so that they can be parallelly disposed along the uneven surface 11 of the object-attached part 10. Accordingly, the first insulated wire 22 and the second insulated wire 23 are parallelly disposed along the uneven surface 11 of the object-attached part 10. Accordingly, when the flat wiring member 20 is disposed along the uneven surface 11 of the object-attached part 10, the flat wiring member 20 is disposed on the uneven surface 11 as closely as possible, and the route of each of the insulated wires 22 and 23 is reduced as much as possible.

It is also applicable that the first insulated wire 22 and the second insulated wire 23 are not parallelly disposed along the uneven surface 11, but at least one of them is curved or meanders.

The curved part 23c of the second insulated wire 23 is joined to the sheet material 28, thus suppressed is that the second insulated wire 23 comes off the sheet material 28 and is caught on the other member.

The base member is the sheet material 28, and the first insulated wire 22 and the second insulated wire 23 are the members disposed on one main surface of the sheet material 28, thus the first insulated wire 22 and the second insulated wire 23 are easily disposed on the sheet material 28 in a free form. For example, as described above, the second insulated wire 23 is easily held by the sheet material 28 in the curved state or the second insulated wire 23 is not partially joined to the sheet material 28 easily as is a case in a second modification example described hereinafter.

Modification Example

In the example described in the above embodiment, one second insulated wire 23 is provided on one side of the first insulated wire 22, and one second insulated wire 23 is provided on the other side. As is a case in a wiring member 120 according to the first modification example illustrated in FIG. 6, a plurality of second insulated wires 123A and 123B corresponding to the second insulated wire 23 may be provided on at least one side of the first insulated wire 22. In this case, the plurality of second insulated wires 123A and 123B may be set to get gradually longer with increasing distance from the first insulated wire 22.

Figure 6:
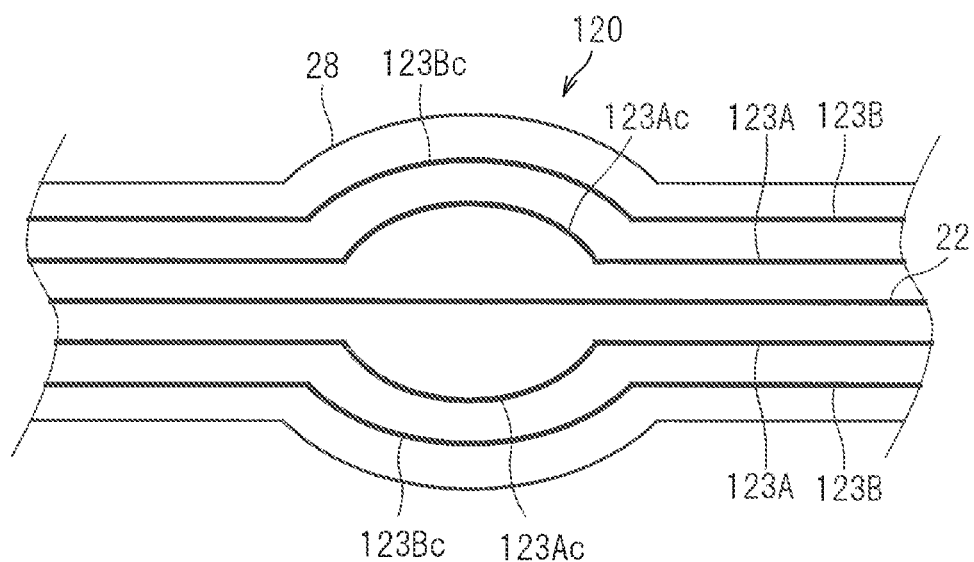
FIG. 6 is a schematic plan view illustrating a wiring member according to a first modification example.

In the example illustrated in FIG. 6, the two second insulated wires 123A and 123B are provided on one side of the first insulated wire 22, and the two second insulated wires 123A and 123B are also provided on the other side. The second insulated wire 123B is provided in a position farther away from the first insulated wire 22 than the second insulated wire 123A. A part 123Bc of the second insulated wire 123B corresponding to the part 23c between the above parts is set longer than a part 123Ac of the second insulated wire 123A corresponding to the part 23c between the above parts, and forms into a longer arc than the part 123Ac.

Assumed herein is a case where the first insulated wire 22 and the second insulated wires 123A and 123B are disposed along the arrangement route P as is the case in the uneven surface 11 of the object-attached part 10 described above. As described above, routes of the second insulated wires 123A and 123B gradually get longer with increasing distance from the position where the first insulated wire 22 is disposed. Even in such a case, in the manner similar to the embodiment described above, the first insulated wire 22 and the second insulated wires 123A and 123B can be disposed along the arrangement route P on the uneven surface 11 as closely as possible.

Figure 7:
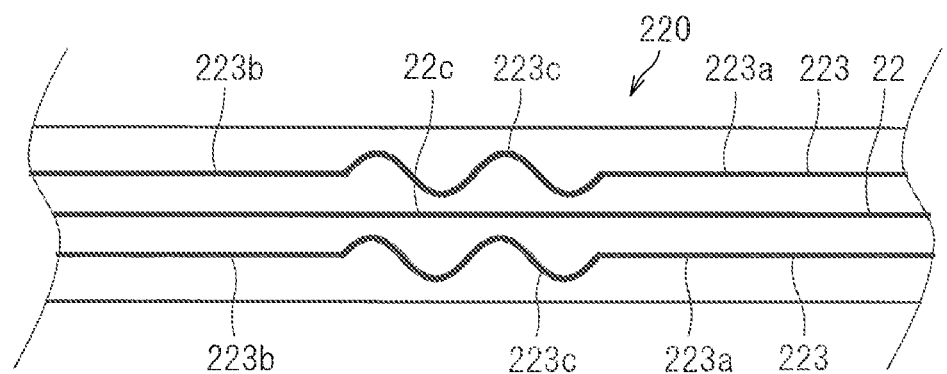
FIG. 7 is a schematic plan view illustrating a wiring member according to a second modification example.

Described in the above embodiment is the example that the curved part 23c of the second insulated wire 23 is joined to the sheet material 28. As is a case in a wiring member 220 according to a second modification example illustrated in FIG. 7, an intermediate part 223c, which is a part longer than the first insulated wire 22, of the second insulated wire 223 corresponding to the second insulated wire 23 may not be joined to the sheet material 28. That is to say, a part 223a of the second insulated wire 223 is joined to the sheet material 28, and the other part 223b is also joined to the sheet material 28. The intermediate part 223c therebetween is not joined to the sheet material 28, and can be free from the sheet material 28. The part 22c of the first insulated wire 22 also needs not be joined to the sheet material 28.

Figure 8:
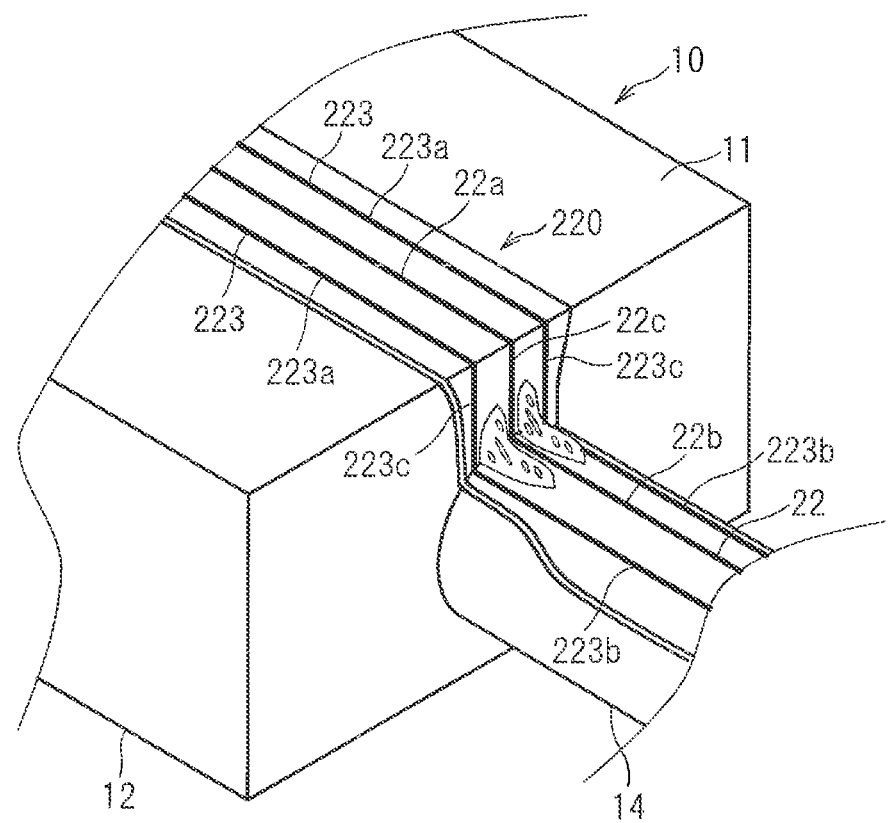
FIG. 8 is an explanation drawing illustrating the wiring member according to the modification example described above disposed along an uneven surface.

As illustrated in FIG. 8, assumed is a case where the present wiring member 220 is disposed along the uneven surface 11 of the object-attached part 10. In this case, the sheet material 28 is provided with a crimp, loosened, or tucked, thus the sheet material 28 can be deformed into a shape of following the uneven surface 11, and the first insulated wire 22 and the second insulated wire 223 can be disposed along the uneven surface 11 of the object-attached part 10 on the surface of the sheet material 28. Thus, the second insulated wire 223 can be freely routed on the uneven surface 11 easily without an influence of the shape of the sheet material 28.

Considered in the embodiment and each modification example described above is that the sheet material 28 is provided with a crimp, loosened, or tucked, to make the sheet material 28 follow the uneven surface 11 as closely as possible. As is a case in a wiring member 320 according to a third modification example illustrated in FIG. 9, at least a part of a sheet material 328 corresponding to the sheet material 28 may be an elongate part 329 which can be elongated. The elongate part 329 may be formed by an elastic sheet made of a rubber, for example, or may also be formed by a mesh which can be elongated. When a part of the sheet material 328 is the elongate part 329, a part 328a which cannot be elongated other than the elongate part 329 and the elongate part 329 can be joined by sewing, welding, or bonding by an adhesive agent, for example. The elongate part 329 is preferably provided in a part where a route length difference occurs between the plurality of insulated wires in the arrangement route P, but may be provided in a wider region than that part, or the whole sheet material may also be an elongate part.

Figure 9:
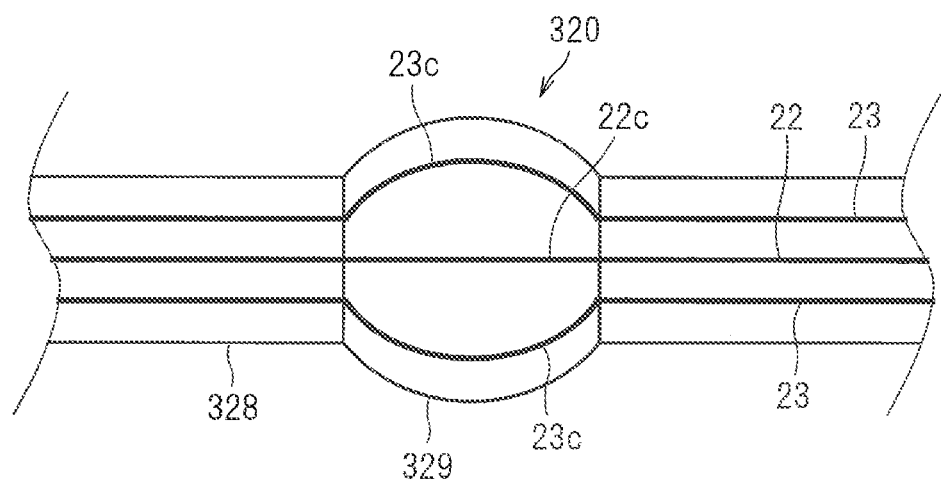
FIG. 9 is a schematic plan view illustrating a wiring member according to a third modification example.

In FIG. 9, the elongate part 329 is provided in a middle portion in an extension direction of the sheet material 328, and the part 22c of the first insulated wire 22 and the part 23c of the second insulated wire 23 are joined to the elongate part 329. Herein, both side parts of the elongate part 329 have a shape curved to be convexed outside. However, this configuration is not necessary, but the both side parts of the elongate part may be formed into a parallelly-extending shape.

Figure 10:
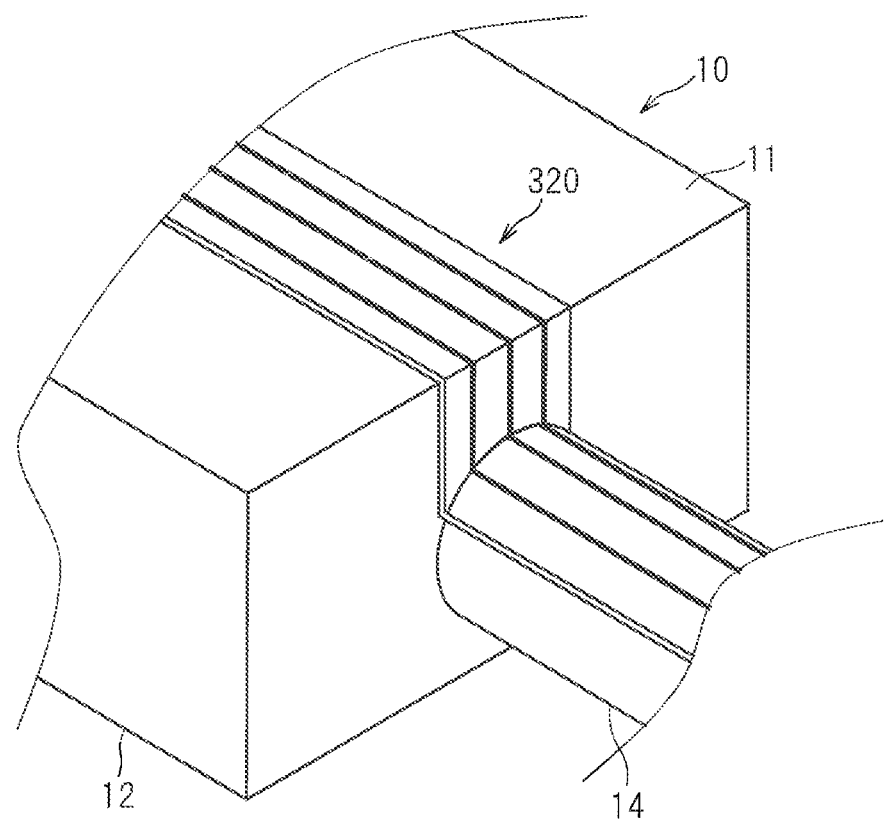
FIG. 10 is an explanation drawing illustrating the wiring member according to the modification example described above disposed along an uneven surface.

In this case, as illustrated in FIG. 10, the elongate part 329 is elongated, and the sheet material 328 can be disposed along the uneven surface 11 as closely as possible. Accordingly, the first insulated wire 22 and the second insulated wire 23 can be disposed along the uneven surface 11 as closely as possible.

As is a case in a wiring member 420 according to a fourth modification example illustrated in FIG. 11, the part 22c of the second insulated wire 23 may not be joined to the elongate part 329. The part 22c of the first insulated wire 22 may not be joined to the elongate part 329.

According to the third and fourth modification examples, the elongate part 329 of the sheet material 328 is elongated, thus the sheet material 328 can be disposed along the uneven surface 11 as closely as possible.

The example that the wire-like transmission member is the insulated wire is described in the embodiment and each modification example described above, however, the configuration of the wire-like transmission member is not limited thereto. The wire-like transmission member may be a wire-like member transmitting electricity or light, for example. For example, the wire-like transmission member may be a general wire having a core wire and a covering around the cores wire, or may also be a bare lead wire, a shielded wire, an enamel wire, a nichrome wire, or an optical fiber, for example.

The wire-like transmission member transmitting the electricity may be various kinds of signal lines or various kinds of power lines.

The wiring member may be a flexible flat cable (FFC) made up of parallelly-arranged wire-like conductors (wire-like transmission member) covered by an insulating covering (base member) such as a film or a flexible print circuit substrate (FPC) in which a print circuit (wire-like transmission member) is formed in an insulating member (base member) such as a resin film, for example. The wiring member may be a flat cable in which insulated wires are parallelly joined (a core wire in the insulated wire is the wire-like transmission member and a parallelly-joined insulating covering is a base member), for example. Even in these cases, it is sufficient that parts of the plurality of wire-like transmission members are partially curved or bent. Accordingly, when the plurality of wire-like transmission members have a route length difference and the part constituting the base member is curved, bent, or elongated in a thickness direction to be disposed to follow the uneven surface 11 as closely as possible, such a wiring member is also applicable in the manner similar to the above case.

Each configuration described in the embodiments and modification examples thereof can be appropriately combined as long as they are not contradictory.

EXPLANATION OF REFERENCE SIGNS 10 object-attached part
11 uneven surface
12 rectangular parallelepiped part
14 cylindrical part
20, 120, 220, 320, 420 wiring member
22 first insulated wire (wire-like transmission member)
22a part of first insulated wire
22b other part of first insulated wire
22c intermediate part of first insulated wire (straight part)
23, 123A, 123B, 223 second insulated wire (wire-like transmission member)
23a, 223a part of second insulated wire
23b, 223b other part of second insulated wire
23c, 123Ac, 123Bc intermediate part of second insulated wire (curved part)
28, 328 sheet material (base member)
28a crimp
29 joint part
29B sewing thread
40 chip
42 anvil
50 wiring member
52 insulated wire
58 sheet material
223c intermediate part of second insulated wire
329 elongate part
P arrangement route

The invention claimed is:

1. A wiring member, comprising:
a plurality of wire-like transmission members disposed along a common route on an object-attached part; and
a base member keeping the plurality of wire-like transmission members in a flat state, wherein
the plurality of wire-like transmission members include a first wire-like transmission member and at least one second wire-like transmission member longer than the first wire-like transmission member,
a part of the first wire-like transmission member and a part of the second wire-like transmission member are held by the base member in a parallel state,
another part of the first wire-like transmission member and another part of the second wire-like transmission member are held by the base member in a parallel state in a position away from the part of the first wire-like transmission member and the part of the second wire-like transmission member,
a length between the part of the second wire-like transmission member and the another part of the second wire-like transmission member is larger than a length between the part of the first wire-like transmission member and the another part of the first wire-like transmission member, and
the another part of the first wire-like transmission member extends on a straight extension of the part of the first wire-like transmission member, and the another part of the second wire-like transmission member extends on a straight extension of the part of the second wire-like transmission member.

2. The wiring member according to claim 1, wherein
the first wire-like transmission member includes a straight part held straight by the base member, and
at least a part of the second wire-like transmission member corresponding to the straight part constitutes a curved part in a curved state.

3. The wiring member according to claim 1, wherein
a length of the first wire-like transmission member is different from a length of the second wire-like transmission member so as to be able to be parallelly disposed along an uneven surface of an object-attached part.

4. The wiring member according to claim 1, further comprising
the plurality of second wire-like transmission members, wherein
the plurality of second wire-like transmission members get gradually longer with increasing distance from the first wire-like transmission member.

5. The wiring member according to claim 1, wherein
a part of the second wire-like transmission member longer than the first wire-like transmission member is held by the base member.

6. The wiring member according to claim 1, wherein
a part of the second wire-like transmission member longer than the first wire-like transmission member is not joined to the base member.

7. The wiring member according to claim 1, wherein
at least a part of the base member is an elongate part which can be elongated.

8. The wiring member according to claim 1, wherein
the base member is a sheet material, and
the plurality of wire-like transmission members are members disposed on one main surface of the sheet material.

* * * * *